(12) United States Patent
Lee et al.

(10) Patent No.: US 8,270,106 B2
(45) Date of Patent: Sep. 18, 2012

(54) LENS MODULE

(75) Inventors: Chai-Wei Lee, Taipei Hsien (TW); Hou-Yao Lin, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 159 days.

(21) Appl. No.: 12/749,462

(22) Filed: Mar. 29, 2010

(65) Prior Publication Data

US 2011/0096424 A1 Apr. 28, 2011

(30) Foreign Application Priority Data

Oct. 28, 2009 (CN) .......................... 2009 1 0308959

(51) Int. Cl.
*G02B 7/02* (2006.01)
(52) U.S. Cl. .......................... 359/829; 359/819; 359/811
(58) Field of Classification Search .................. 359/811, 359/813, 819–822, 829
See application file for complete search history.

(56) References Cited

U.S. PATENT DOCUMENTS

| 7,605,991 B2 * | 10/2009 | Chiang | 359/811 |
| 2002/0089176 A1 * | 7/2002 | Iwasaki | 285/92 |
| 2005/0254126 A1 * | 11/2005 | Lin et al. | 359/430 |
| 2008/0266675 A1 * | 10/2008 | Chiang | 359/700 |

* cited by examiner

*Primary Examiner* — Thomas K Pham
*Assistant Examiner* — Brandi Thomas
(74) *Attorney, Agent, or Firm* — Altis Law Group, Inc.

(57) ABSTRACT

A lens module includes a barrel, a holder, and a ring-shaped elastic member. The barrel includes a connecting portion and a resisting portion, the connecting portion includes a first screw thread. The holder includes a second screw thread engaged with the first screw thread. The ring-shaped elastic member is compressed between the resisting portion of the barrel and the holder. The elastic member includes a number of first segments and a number of second segments, the first segments and the second segments are arranged in an alternate fashion and connected to each other, at least one of the first segments and the second segments is V-shaped.

7 Claims, 6 Drawing Sheets

LENS MODULE

BACKGROUND

1. Technical Field

The present disclosure relates to lens modules and, particularly, to a lens module with a barrel and a holder threadedly engagable with the barrel.

2. Description of Related Art

A lens module usually includes a barrel with lenses received therein and a holder for receiving an image sensor. To focus the lens module, the barrel and the holder should be movable relative to each other along the optical axis of the lens module. To make the barrel and the holder movable relative to each other, they are typically loosely threadedly engaged. However, excess movement associated with the loose fit lowers the precision of focusing movements.

What is needed, therefore, is a lens module to overcome or at least mitigate the above-described problem.

BRIEF DESCRIPTION OF THE DRAWINGS

Many aspects of the present lens module can be better understood with reference to the accompanying drawings. The components in the drawings are not necessarily drawn to scale, the emphasis instead being placed upon clearly illustrating the principle of the present lens module. In the drawings, all the views are schematic.

DETAILED DESCRIPTION

Embodiments of the present disclosure will now be described in detail below, with reference to the accompanying drawings.

Figure 1:
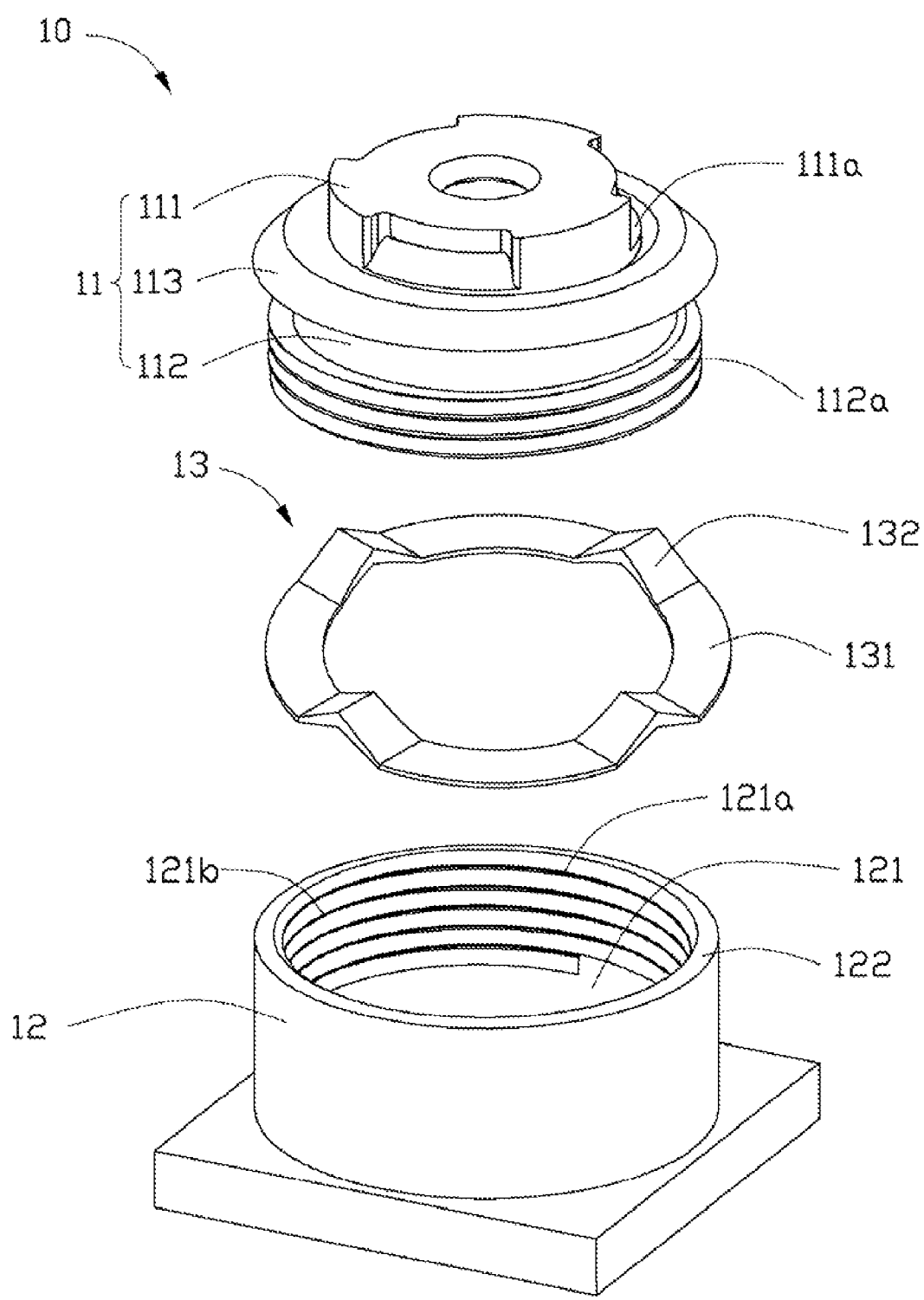
FIG. 1 is an exploded, isometric view of a lens module according to an exemplary embodiment.
Figure 2:
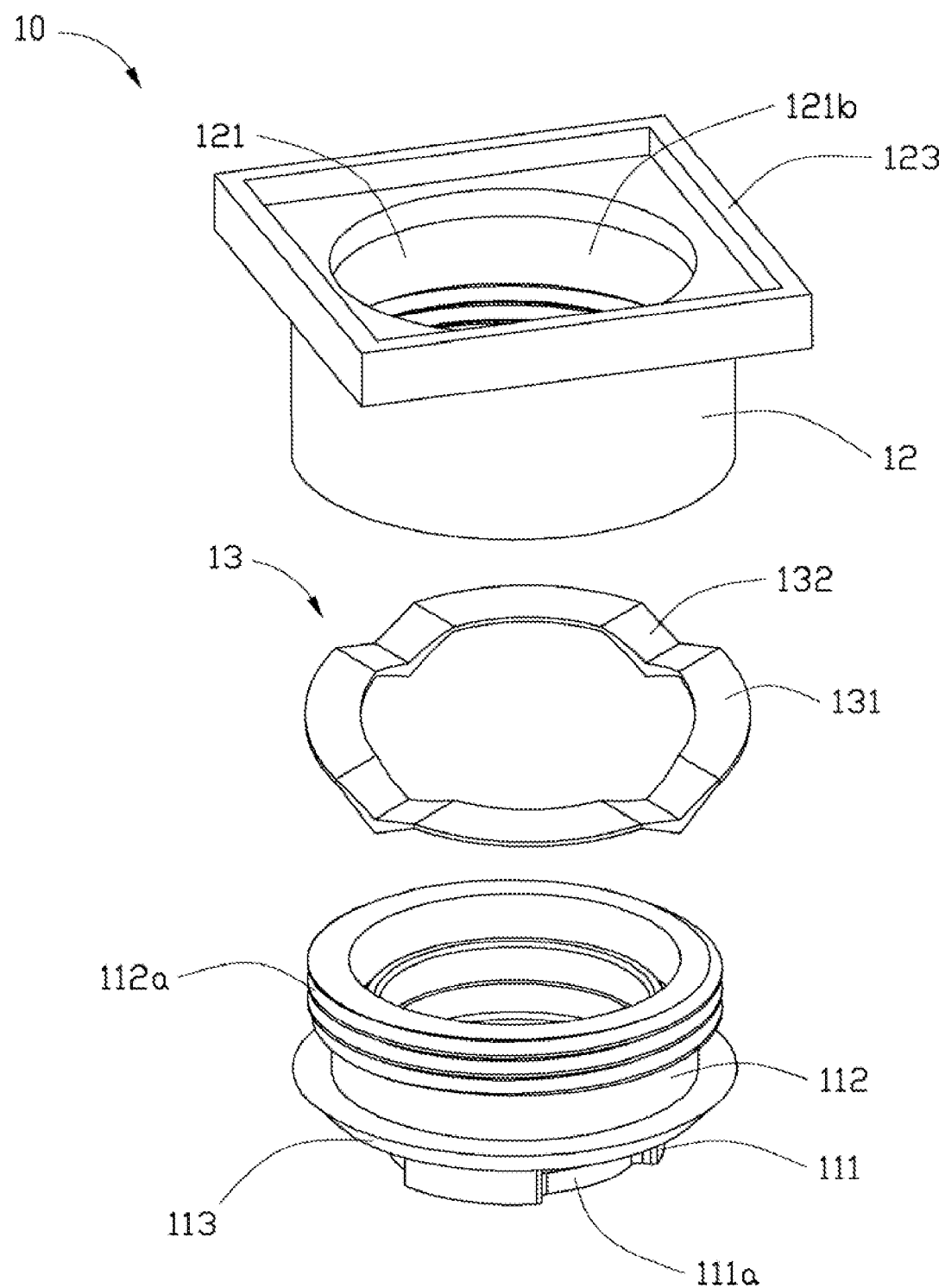
FIG. 2 is an exploded, isometric view of the lens module of FIG. 1, viewed from an opposite side.

Referring to FIGS. 1 and 2, a lens module 10, according to an exemplary embodiment, is shown. The lens module 10 includes a barrel 11, a holder 12, and an elastic member 13.

The barrel 11 includes an operation portion 111, a connecting portion 112, and a resisting portion 113. The operation portion 111 is arranged away from the holder 12. The operation portion 111 defines a number of cutouts 111a in the circumference surface thereof, thus, users can focus by rotating the barrel 11 conveniently by applying a force on the operation portion 111. The connecting portion 112 is arranged adjacent to the holder 12. The connecting portion 112 includes an outer screw thread 112a for engaging with the holder 12. The resisting portion 113 is disposed between the operation portion 111 and the connecting portion 112. The outer diameter of the resisting portion 113 is bigger than that of the connecting portion 112.

The holder 12 includes a top surface 122 facing the resisting portion 113 of the barrel 11 and a bottom surface 123 facing away from the barrel 11. The holder 12 defines a through hole 121 running through the top surface 122 and the bottom surface 123 of the holder 12 for receiving the connecting portion 112 of the barrel 11. The holder 12 includes an inner screw thread 121a on an inner surface 121b of the holder 12 surrounding the through hole 121. The inner screw thread 121a is engagable with the outer screw thread 112a of the connecting portion 112 of the barrel 11.

Figure 3:
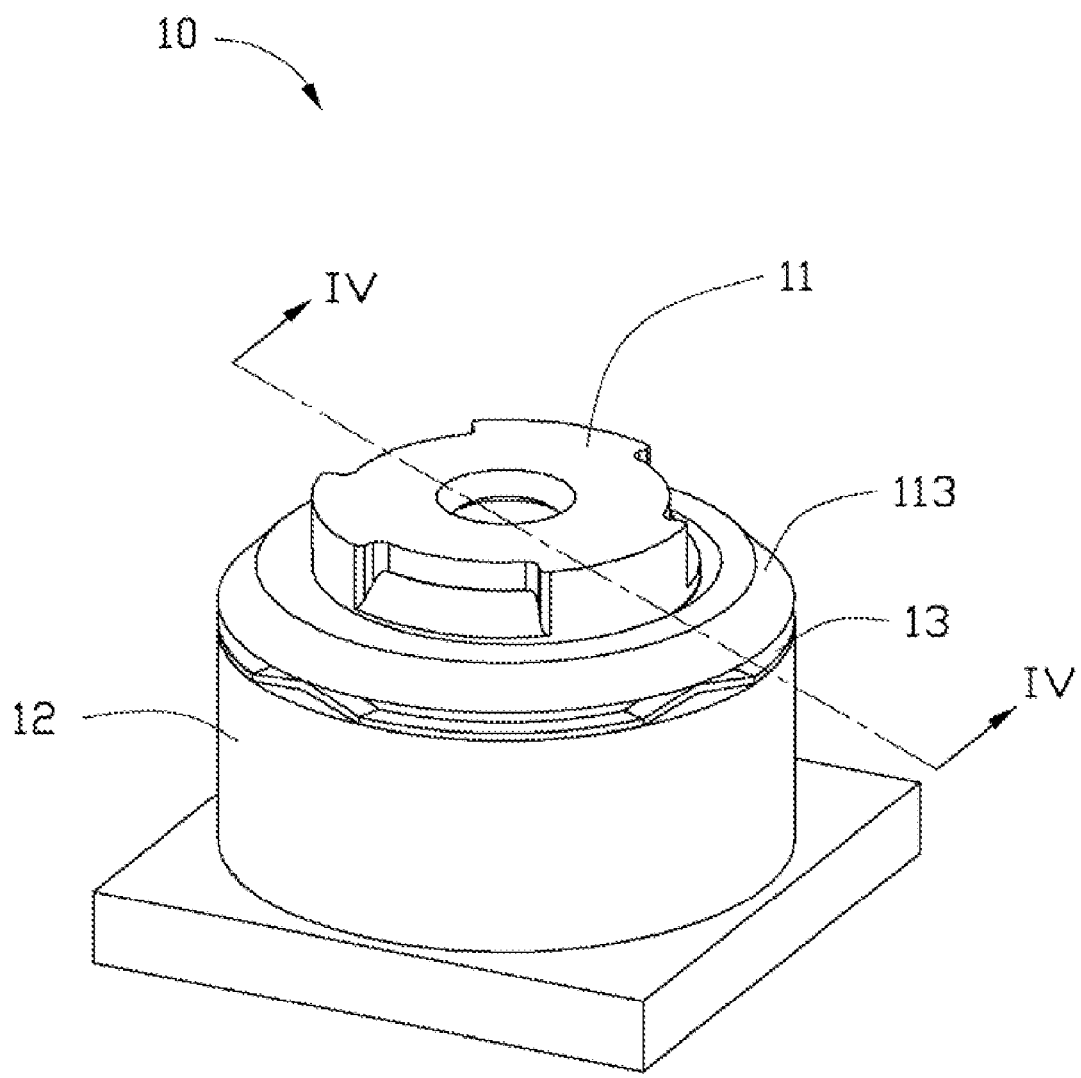
FIG. 3 is an assembled, isometric view of the lens module of FIG. 1.
Figure 4:
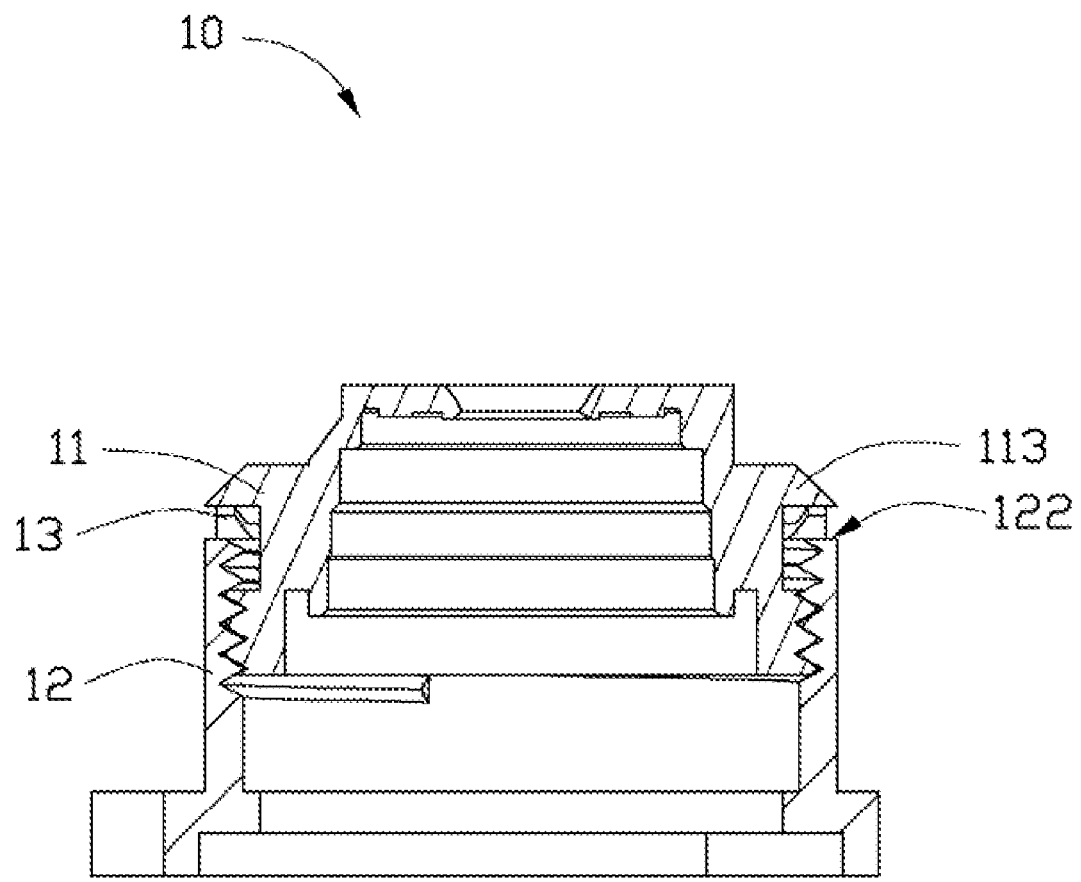
FIG. 4 is a cross sectional view of the lens module taken along line IV-IV of FIG. 3.

The elastic member 13 is disposed between the resisting portion 113 of the barrel 11 and the top surface 122 of the holder 12. Referring to FIGS. 3 and 4, after the lens module 10 is assembled, the elastic member 13 is kept in a compressed state between the resisting portion 113 of the barrel 11 and the top surface 122 of the holder 12, thus, tension is provided to prevent excess movement of the barrel 11 associated with the loose fit between the inner screw thread 121a and the outer screw thread 112a.

In the present embodiment, the elastic member 13 is a ring-shaped elastic sheet. The inner diameter of the elastic member 13 is bigger than the outer diameter of the connecting portion 112 of the barrel 11, and smaller than the outer diameter of the holder 12 and the outer diameter of the resisting portion 113 of the barrel 11. The elastic member 13 includes a number of first segments 131 and a number of second segments 132. The first segments 131 and the second segments 132 are arranged in an alternate fashion and connected to each other. The first segments 131 are flat, and the second segments 132 are V-shaped and protrude towards the resisting portion 113 of the barrel 11. The second segments 132 are equidistantly arranged.

Figure 5:
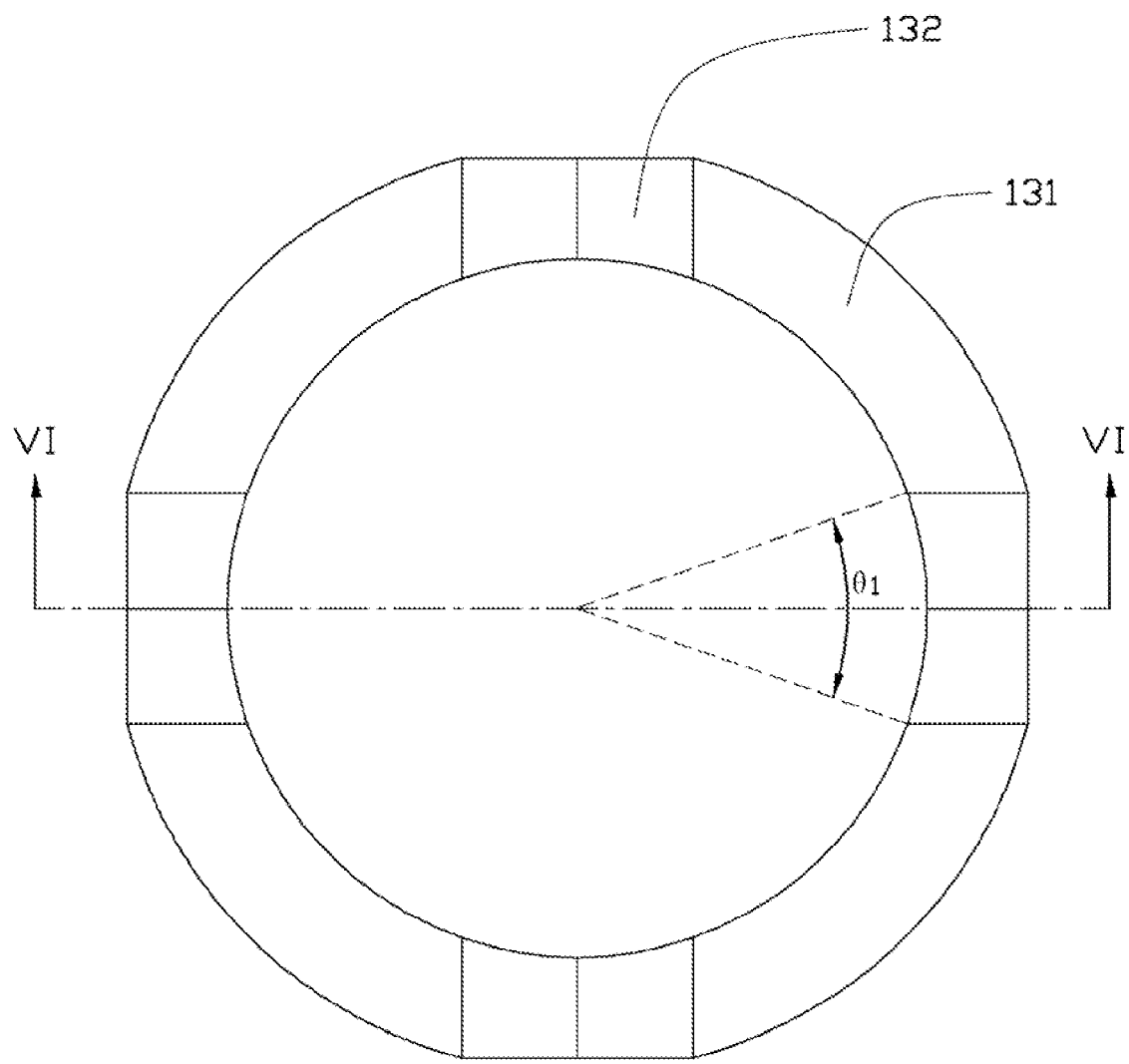
FIG. 5 is a top plan view of an elastic member of the lens module of FIG. 1.
Figure 6:
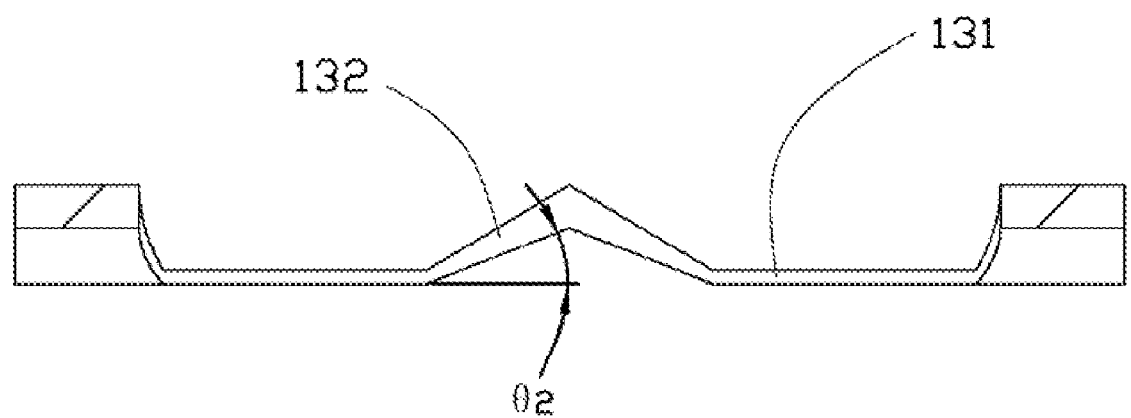
FIG. 6 is a cross sectional view of the elastic member taken along line VI-VI of FIG. 5.

Further referring to FIGS. 5 and 6, to ensure that the elastic member 13 has good elastic performance, the second segment 132 satisfies the conditions: $30°<\theta 1<80'$; and $20°<\theta 2<60°$, wherein, $\theta 1$ is a central angle whose vertex is the center of the elastic member 13, and whose sides pass through two ends of the second segment 132; and $\theta 2$ is an angle formed by a surface of the first segment 131 facing the holder 12 and a surface of the adjoining second segment 132 facing the holder 12.

It should be understood, the shape of the elastic member 13 is not limited to this embodiment. In other embodiments, the first segments 131 can be V-shaped and protrude towards the top surface 122 of the holder 12.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A lens module comprising:
    a barrel comprising a connecting portion and a resisting portion, the connecting portion comprising a first screw thread;
    a holder comprising a second screw thread engaged with the first screw thread; and
    a ring-shaped elastic member compressed between the resisting portion of the barrel and the holder, the elastic member providing an elastic force to axially tighten the first screw thread and the second screw thread, simultaneously allowing threaded movement of the first screw thread and the second screw thread to adjust the axial position of the barrel relative to the holder;
    wherein the elastic member is an elastic sheet, the elastic member comprising a plurality of first segments and a plurality of second segments, the first segments and the second segments being arranged in an alternate fashion and connected to each other, at least one of the first segments and the second segments being V-shaped.

2. The lens module as claimed in claim 1, wherein the V-shaped segments of the elastic member resist the resisting portion of the barrel.

3. The lens module as claimed in claim 1, wherein the first segments are flat, and the second segments are V-shaped and protrude from the first segments towards the resisting portion of the barrel.

4. The lens module as claimed in claim 3, wherein the second segments are equidistantly arranged.

5. The lens module as claimed in claim 4, wherein the elastic member satisfies the condition: $30°<\theta 1<80°$, wherein, $\theta 1$ is a central angle whose vertex is the center of the elastic member.

6. The lens module as claimed in claim 4, wherein the elastic member satisfies the condition: $20°<\theta 2<60°$, wherein, $\theta 2$ is an angle formed by a surface of the first segment facing the holder and a surface of the adjoining second segment facing the holder.

7. A lens module comprising:
 a barrel comprising a connecting portion and a resisting portion, the connecting portion comprising a first screw thread;
 a holder comprising a second screw thread engaged with the first screw thread; and
 a ring-shaped elastic member compressed between the resisting portion of the barrel and the holder, the elastic member providing an elastic force to axially tighten the first screw thread and the second screw thread, simultaneously allowing threaded movement of the first screw thread and the second screw thread to adjust the axial position of the barrel relative to the holder;
 wherein the first screw thread is an outer screw thread, and the second screw thread is an inner screw thread;
 wherein the resisting portion is connected to the connecting portion, the outer diameter of the resisting portion is bigger than that of the connecting portion, the holder comprises a top surface facing the barrel, and the elastic member is compressed between the top surface of the holder and the resisting portion.

* * * * *